United States Patent
Lohweg et al.

(10) Patent No.: US 7,477,294 B2
(45) Date of Patent: Jan. 13, 2009

(54) METHOD FOR EVALUATING AND CORRECTING THE IMAGE DATA OF A CAMERA SYSTEM

(75) Inventors: Volker Lohweg, Bielefeld (DE); Harald Heinrich Willeke, Paderborn (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 872 days.

(21) Appl. No.: 10/504,845

(22) PCT Filed: Feb. 22, 2003

(86) PCT No.: PCT/DE03/00567

§ 371 (c)(1),
(2), (4) Date: Aug. 26, 2004

(87) PCT Pub. No.: WO03/073748

PCT Pub. Date: Sep. 4, 2003

(65) Prior Publication Data
US 2005/0146733 A1    Jul. 7, 2005

(30) Foreign Application Priority Data
Feb. 26, 2002  (DE) ................ 102 08 285

(51) Int. Cl.
H04N 9/73     (2006.01)
H04N 1/60     (2006.01)
G03F 3/08     (2006.01)
G06K 9/00     (2006.01)

(52) U.S. Cl. ................ 348/223.1; 358/1.9; 358/518; 382/167

(58) Field of Classification Search ............... 348/225.1, 348/179, 188, 333.12
See application file for complete search history.

(56) References Cited

U.S. PATENT DOCUMENTS

| 4,551,760 A | 11/1985 | Bendell |
| 4,736,244 A * | 4/1988 | Shiota et al. ................ 358/506 |
| 4,930,009 A | 5/1990 | Shiota |
| 5,189,511 A | 2/1993 | Parulski et al. |
| 5,331,428 A | 7/1994 | Uffel |

(Continued)

FOREIGN PATENT DOCUMENTS

DE    39 22 176 A1    10/1991

(Continued)

OTHER PUBLICATIONS

Fokus auf Farbmanagement; Polygrahph; 1996; pp. 22-24; vol. 5.

(Continued)

*Primary Examiner*—Luong T Nguyen
(74) *Attorney, Agent, or Firm*—Jones, Tullar & Cooper, P.C.

(57) ABSTRACT

The image data of a camera system is corrected. The camera system includes a color camera which supplies three output signals to three separate color channels, in the form of output signal vectors. The output signal vectors, the coefficients of which represent the output signals supplied by the color camera to the three color channels in a specific position lying in the range of observation, are multiplied by a correction matrix, particularly a square one. The corrected output signal vectors are then processed further in the camera system.

20 Claims, 1 Drawing Sheet

U.S. PATENT DOCUMENTS

| | | |
|---|---|---|
| 5,331,441 A | 7/1994 | Akuzawa et al. |
| 5,668,596 A * | 9/1997 | Vogel .................. 348/222.1 |
| 6,057,946 A | 5/2000 | Ikeda et al. |
| 6,278,533 B1 | 8/2001 | Takemoto |
| 6,424,374 B2 * | 7/2002 | Itakura .................. 348/222.1 |
| 6,982,752 B2 * | 1/2006 | Kharitoneko et al. .... 348/222.1 |
| 7,262,796 B2 * | 8/2007 | Jaspers .................. 348/223.1 |
| 2001/0013894 A1 | 8/2001 | Parulski et al. |

FOREIGN PATENT DOCUMENTS

| | | |
|---|---|---|
| EP | 0 891 077 A2 | 1/1999 |
| EP | 1 028 595 A2 | 8/2000 |
| JP | 3-84563 | 4/1991 |
| JP | 5-122708 | 5/1993 |
| JP | 6-233333 | 8/1994 |
| WO | WO 98/39627 | 9/1998 |

OTHER PUBLICATIONS

The Reproduction of Colour; Fontain Press; 1975; pp. 386-390; Third Edition.

* cited by examiner

METHOD FOR EVALUATING AND CORRECTING THE IMAGE DATA OF A CAMERA SYSTEM

CROSS-REFERENCE TO RELATED APPLICATIONS

This application is the U.S. National Phase under 35 USC 371 of PCT/DE 03/00570, filed Feb. 22, 2003; published as WO 03/073748 A2 on Sep. 4, 2003 and claiming priority to DE 102 08 285.5 filed Feb. 26, 2002, the disclosures of which are expressly incorporated herein by reference.

FIELD OF THE INVENTION

The present invention is directed to a method for evaluating and correcting the image data of a color camera system that is particularly well suited for inspecting color printed products.

BACKGROUND OF THE INVENTION

Camera systems are widely used for various applications, particularly in the printing industry. For example, camera systems can be used for registration measuring systems, inspection systems or web monitoring systems. In many cases digital image sensors such as CCD cameras are employed as color cameras, whose light-sensitive pixels provide three output signals corresponding to the colors recorded in the observation area via three separate color channels, usually for the colors red, green and blue.

In connection with the known camera systems, a problem occurring during the inspection of colored printed products is that the color data provided by the color cameras often do not correspond to the color sense of the human eye. Unprocessed image data from these color cameras are unsatisfactory in the areas of color balance, brightness, contrast and reproduction of the color hue when compared to human color perception. Both optical devices and illumination devices have shortcomings and the spectral sensitivity distribution of CCD cameras exacerbates the color balance problems, brightness problems, contrast problems and color hue problems. The sensitivity distribution of the cameras used does not always agree with the sensitivity distribution of the human eye, and so the image data provided by the color camera makes a false visual impression during later processing, such as when viewed on a video display monitor.

A method for correcting image data by means of a correction matrix is disclosed in U.S. Pat. No. 5,189,511.

U.S. Pat. No. 4,930,009, U.S. Pat. No. 5,331,441 and U.S. Pat. No. 6,278,533 also disclose methods for correcting image data of a camera system with a color camera, using a correction matrix.

SUMMARY OF THE INVENTION

The object of the present invention is evaluating and correcting the image data of a camera system.

In accordance with the invention, this object is attained by a method for correcting the image data of the camera system, particularly suited for the inspection of colored printed products having a color camera providing three output signals corresponding to the colors recorded, for three separate color channels in the form of output signal vectors. The output signal vectors, whose coefficients (R, G, B) represent the output signals provided by the color camera for the three color channels at a defined position in the observation area, are multiplied with a correction matrix, preferably a quadratic correction matrix.

A prerequisite for processing the image data of the camera system in accordance with sensitivity is that as many as possible of the colors recorded by the color camera are arranged sufficiently correctly in regard to hue, saturation and brightness in a color range which corresponds to the color sensitivity of the human eye. Commission Internationale de l'Éclairage (CIE), is an international clearinghouse for color research at universities and research laboratories. A recent milestone in this effort was the CIE L*a*b* color system (CIELAB for short), first published in 1976. In this method, the so-called CIELAB color range is particularly suitable and is widely used in the printing industry. A measurement number for the accuracy of color differences in accordance with sensed color differences is provided in the CIELAB color range by determining the geometric distance between the nominal and the actual value of CIELAB color model variables L, A and B (Delta E).

In the method of the present invention the output signal vectors are multiplied by, preferably, a quadratic correction matrix, and so the image data can be changed in a simple way so that they approach the color perception of the human eye. Multiplication by a correction matrix provides a relatively accurate arrangement of all printing colors in a basically arbitrary color range. Moreover, the conversion by multiplication with a correction matrix can be performed on camera image data in such a simple way that practical and cost effective implementation is possible even for large amounts of image data.

The coefficients of the correction matrix determine the quality of the correction since the output signal vectors are transformed in different ways, depending on the selection of these coefficients. For example, the coefficients of the correction matrix can be determined from empirical values and can then be permanently stored in a computer memory. In order to be able to match the coefficients of the correction matrix variably to different marginal values, for example when compensating for a known camera, given illumination conditions or the given optical device used, an iterative approximation algorithm is used. For performing this approximation algorithm it is necessary to first provide a reference color table, for example an IT8-chart with 288 color fields. Different reference colors are represented in the color fields. The classification of the different reference colors in a suitable color range, for example the CIELAB color range, is known. By means of known transformations it is possible to calculate corresponding nominal output signals for the three color channels from these predetermined CIELAB values for the various reference colors of the reference color table. As a result, a reference color table is predetermined as the input value for the approximation algorithm, and for every reference color a nominal vector for the three color channels is the desired result of the conversion. In the course of performing the approximation algorithm for determining the coefficients of the correction matrix, the reference color table is now recorded with the color camera, and an output signal vector of the color camera is determined for each color field. The difference between these output signal vectors of the color camera and the predetermined nominal vectors corresponds to the difference between the color perception of the human eye and the sensitivity distribution of the color camera.

Advantageously, this method includes calculation of the color correction values for different illumination sources and changes among different illumination sources. At present, the standard light source, known as a D50 is used in printing technology. By predetermining the illumination characteristics of a D50 light source it is possible to match the Rec. 709 color standard by conversion to the D50 standard light, so that the intensities of the non-linear R', G', B' values act as if the object to be investigated were illuminated by a D50 standard light's illumination. A measurement method interactively matches the values of the R', G', B' color range with the CIELAB color range, to adapt the color ranges to each other without a real standard illumination being required. This method has the advantage that in case of a change of the standard light conditions to be expected, the change in illumination can be compensated for immediately by executing the method of the present invention in computer software.

The starting point for an iteration is a correction matrix whose coefficients are preset as initial values. These initial values can either be selected completely randomly or can be set to pre-defined empirical values. In the first iteration step, the correction matrix is multiplied by all output signal vectors, and the corrected output signal vectors obtained are placed in the computer's buffer storage. Next, if the corrected output signal vectors approach the preset nominal vectors, the coefficients of the correction matrix are slightly changed, and the multiplication is performed again. The change of the coefficients of the correction matrix is here accepted only if the corrected output signal vectors approach the preset nominal vectors.

Next, the approach of the corrected output signal values is compared to the preset nominal vectors for each iteration step in order to be able to decide, on the basis of this comparison, whether the changes of the coefficients of the correction matrix made in this iteration step are to be used or discarded. In the comparison or assessment method of the present invention, the difference value between the corrected output signal value and the nominal vector predetermined for the color field is determined for each color field of the reference color table, and the sum of all these difference values is added together. The change of the correction coefficient of the correction matrix in the last iteration step is then used only if the sum of all difference values in the last iteration step has become smaller. But if the sum of all difference values by changing the coefficient of the correction matrix has become larger in the last iteration step, the change in the coefficients is not used and discarded. By checking the sum of the difference values over all reference colors, it is easily possible that the difference for individual reference colors increases in the course of an iteration step. However, as a whole, minimizing the difference values over all color channels is dependably assured.

Another problem with existing camera systems is the correct setting of the color balance, i.e. the correct weighting of the three color channels in respect to each other. To be able to set the color balance of the individual color channels in relation to each other, a correction vector can be added to each output signal vector, and at the same time the coefficients of each output signal vector can be multiplied by three color channel-dependent correction factors. This correction of the three color channels corresponds to a linear representation of the individual coefficients of the output signal vectors.

A particularly good color balance is achieved if the correction vector and the three color channel-dependent correction factors are selected so that the corrected output signal vectors correspond to a standard. The corrected output signal vectors are obtained by applying the correction with the correction vector. The three correction factors for the reference values black and white preferably correspond exactly to the nominal vectors preselected for these two color fields. This means, in other words, that the linear representation of the output signal vectors is selected in such a way that corrected results are obtained for the two reference grey-scale values, black and white, which correspond to the contrast perception of the human eye. This linear representation is applied to all output signal vectors, so that brightness and contrast are automatically corrected in the entire color spectrum.

CCD color cameras with a plurality of pixels, which are arranged flat or in line shapes, are particularly suitable for executing the method in accordance with the invention. These CCD cameras also have three color channels and provide output signal vectors by pixels as the image data, whose coefficients represent each of the three output signals for the three color channels (red, green, blue). If, for example, the CCD color camera is provided with a million pixels, this corresponds to an image data amount of one million output signal vectors, each with three coefficients, for each image.

When using CCD color cameras, color distortion and a drop of intensity can occur, in particular at the edges of the camera images. These distortions are created by the lenses used. It is possible to use a so-called shading correction for correcting this drop in intensity. To this end, three color channel-dependent correction factors are preset for each pixel. By multiplying these pixel-dependent correction factors with the coefficients of the output signal vectors, it is possible to compensate the pixel-specific color distortions, or a drop in intensity based on the structural type, in the different areas of the CCD chips.

These pixel-specific, color channel-dependent correction factors can for example be experimentally determined in a simple way, in that the observation area of the CCD camera is covered in a homogeneous material, in particular a homogeneous white material, and an output signal vector is determined for each pixel by triggering the camera. The output signal vector having the highest coefficients, and therefore represents the brightest point in the observation area, is then filtered out of all these output signal vectors. But since the observation area is covered by a homogeneous colored material, all pixels should provide output signal vectors which essentially agree identically with each other. Therefore the respective differences are based on color distortions or on a drop in intensity because of the structural type. To compensate for this, correction factors are now selected for each color channel of each individual pixel, which assure that during the recording of the homogeneous colored material all output signal vectors correspond to the output signal vector at the brightest spot in the observation area.

Color distortions in particular greatly depend on the illumination conditions in the observation area. For excluding error sources because of a change of the illumination conditions, the illumination during the experimental determination of the pixel-specific color channel-dependent correction factors should correspond to the illumination during the subsequent use of the camera system.

In many applications of the method of the invention, the corrected output signal vectors obtained by correcting the output signal vectors of the color camera are used for controlling the three separate color channels of a color image monitor. The representation of the colors on a color image monitor also poses the problem that the representational characteristics of most color image monitors do not correspond to the color perceptions of the human eye. This is based in particular on the fact that the brightness conditions of monitors as a rule are not linear, i.e. the intensity of the light reproduced on the screen is a non-linear function of the electric input signals. In other words this means that undesired distortions in the color image on the display screen occur in case the output signal vectors which, in accordance with the invention, have been corrected according to the color perceptions, are simply transmitted to the color image monitor and are displayed there without taking the non-linearity of the brightness conditions into consideration.

To prevent such color distortions in the display on a color image monitor, the coefficients of the corrected output signal vector as basis can be exponentiated by a factor γ. By means of this non-linear conversion of the coefficient of the corrected output signal vectors it ifs possible to compensate the non-linearity of the brightness conditions of most color image monitors. For most color image monitors, the factor γ must be selected in the value range between 0.3 and 0.5 and preferably, γ is selected to be approximately 0.45.

In order not to have to calibrate the illumination source to a standard light source when using corresponding camera systems, it is possible in accordance with invention to perform a further correction step. In this correction step the coefficients of the output signal vectors are converted in such a way that the result corresponds to those output signal vectors, which would be obtained when illuminating the observation area with a standard light.

An exemplary embodiment of the invention is represented in the drawings and will be described in greater detail in what follows.

DESCRIPTION OF THE PREFERRED EMBODIMENT

Figure 1:
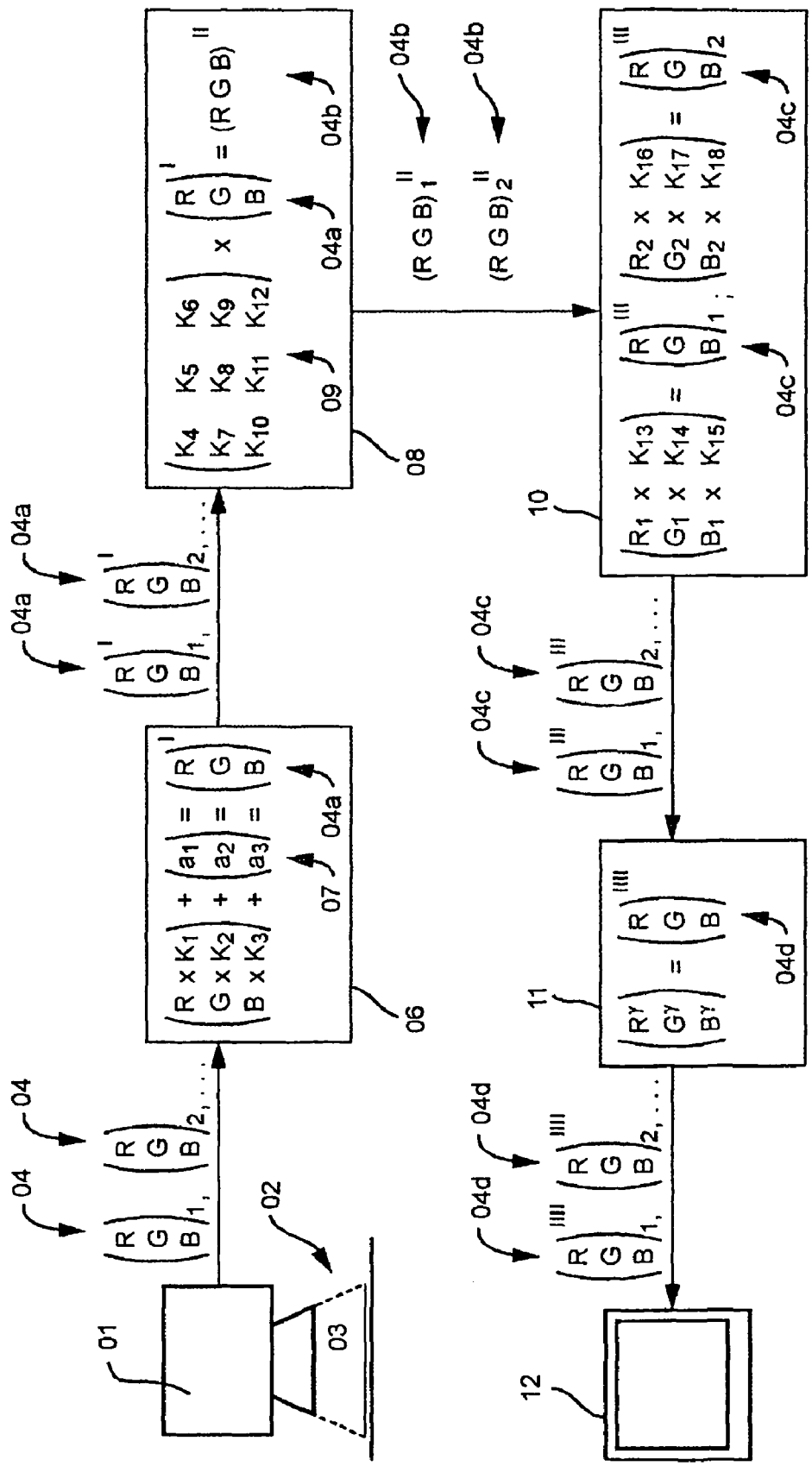
FIG. 1, the sole drawing figure, shows the different method steps in the course of executing an embodiment of the method, in accordance with the invention.

Referring to FIG. 1, a printed product 03, is arranged in an observation area 02 and is imprinted in colors. An image of printed product 03 is recorded with a color camera 01, preferably a CCD camera. A CCD chip is provided in the color camera 01, which converts the image information in the observation area 02 into electronic image data. In the course of this conversion, an output signal vector 04 is generated by each light-sensitive pixel of the CCD chip. A number of output signal vectors 04 corresponding to the number of pixels on the CCD chip are made available by the color camera 01 for further processing.

Each output signal vector 04 preferably includes three coefficients R, G and B. The coefficients R, G and B correspond to the color values of the three color channels red, green and blue, wherein the color of the printed product 03 at the position in the observation area which was recorded by the corresponding pixel, corresponds to the mixture of the three color channels red, green and blue.

The output signal vectors 04 have an index corresponding to the arrangement of the respective pixel on the CCD chip, are further processed in the form of raw data in a first correction module 06 for matching the color balance, brightness and contrast. For this purpose, the coefficients R, G, B of the output signal vector 04 are all multiplied by the color channel-dependent correction factors $K_1$, $K_2$ and $K_3$, and a correction factor 07 with fixed value coefficients $a_1$, $a_2$ and $a_3$ is added to the resultant vector. The corrected output signal vectors 04a are created by means of this calculation operation, which improves the color balance, the brightness and the contrast of the image data. This aim is achieved because the color channel-dependent correction factors $K_1$, $K_2$ and $K_3$, as well as the coefficients $a_1$, $a_2$ and $a_3$ of the correction vector 07, are selected to meet previously selected standards. In the exemplary embodiment, when recording the CIELAB reference or grey scale values for black and white, the output signal vectors 04 generated in the process by the color camera 01 are transformed such that the corrected output signal vectors 04a will correspond to nominal values such as those resulting from the conversion of the known CIELAB color values to nominal vectors.

In the next step, the corrected output signal vectors 04a are passed on to a second correction module 08. In the correction module 08 each output signal vector 04a is multiplied with, preferably, a 3×3 correction matrix 09, and the corrected output signal vectors 04b are calculated from this. In the preferred embodiment, the coefficients $K_4$ to $K_{12}$ of the correction matrix 09 are determined in advance using a suitable iteration process so that the image information contained in the output signal vectors 04a approximates the color perception of the human eye.

In the next step, the corrected output signal vectors 04b are passed on to a third correction module 10. In the third correction module 10, color channel-dependent correction factors for each pixel are stored in a computer memory or data bank, and are multiplied with the coefficients R, G and B for matching the intensity values, which are a function of the position of the respective pixels. As a result, the corrected output signal vector 04b of the first pixel is multiplied by the correction factors $K_{13}$, $K_{14}$ and $K_{15}$ in order to calculate therefrom a corrected output signal vector 04c for the first pixel. The calculation of the corrected output signal vector 04b takes place pixel by pixel. Therefore the number of the pixel-specific correction factors corresponds to three times the number of the pixels.

In the next step, the corrected output signal vectors 04c are passed on to a fourth correction module 11, for video monitor non-linear characteristic compensation. In the fourth correction module 11 the coefficients R, G, B of the corrected output signal vectors 04c are raised to the power of a factor γ or exponentiated by a factor γ, and the corrected output signal vectors 04d are calculated from the result. The non-linear brightness transmission function of video monitor 12 is taken into consideration by performing this exponentiation step.

As a result, correcting the output signal vectors 04 in the correction modules 06, 08, 10 and 11 makes the color images represented on the screen of the color image video monitor 12 match the color perception of the human eye so that the visual impression, when viewing the display at the color image monitor 12, corresponds closely to the color perception which would arise when directly viewing the printed product 03.

While preferred embodiments of a method for evaluating and correcting image data, in accordance with the present invention, have been set forth fully and completely hereinabove, it will be apparent to one of skill in the art that various changes in, for example, the specific corrected output signal vector, the type of printed product observed, and the like can be made without departing from the true spirit and scope of the present invention which is accordingly to be limited only by the appended claims.

What is claimed is:

1. A method for correcting the image data of a camera system for the inspection of colored printed products, comprising the steps of:
   (a) providing an observation area adapted to receive and illuminate a printed product;
   (b) providing a color camera adapted to generate first, second and third output signals for first, second and third separate color channels in the form of output signal vectors, said first, second and third output signals corresponding to image colors recorded;
   (c) aiming said color camera at said printed product in said observation area;

(d) generating said first, second and third camera output signals corresponding to a recorded printed product image;

(e) multiplying said first camera output signal by a first color-channel dependant correction factor and adding the result to a first correction vector to generate a first camera corrected output signal vector;

(f) multiplying said second camera output signal by a second color-channel dependant correction factor and adding the result to a second correction vector to generate a second camera corrected output signal vector;

(g) multiplying said third camera output signal by a third color-channel dependant correction factor and adding the result to a third correction vector to generate a third camera corrected output signal vector;

(h) defining a camera corrected output signal vector matrix comprising said first, second and third camera corrected output signal vectors;

(i) defining a correction matrix comprising selected correction coefficients; said selected correction coefficients being selected by an iterative approximation process and compared to a reference color table; and (j) multiplying said camera corrected output signal vector matrix with said correction matrix to generate a second corrected output signal vector.

2. The method for correcting the image data of claim 1, wherein said correction matrix comprises a quadratic correction matrix.

3. The method for correcting the image data of claim 2, wherein said correction matrix comprises a 3×3 quadratic correction matrix having the selected correction coefficients; said selected correction coefficients being selected by the iterative approximation process and compared to the reference color table of data representing an approximation of the color perception of a human eye.

4. The method for correcting the image data of claim 1, wherein said color camera's first, second and third output signals are for red, green and blue separate color channels in the form of the output signal vectors, said first, second and third output signals corresponding to red, green and blue colors recorded.

5. The method for correcting the image data of claim 4, wherein said camera corrected output signal vector matrix comprises red, green and blue camera corrected output signal vectors.

6. The method for correcting the image data of claim 1, wherein said first, second and third color-channel dependant correction factors are selected to match color balance among red, green and blue colors.

7. The method for correcting the image data of claim 1, wherein said first, second and third color-channel dependant correction factors are selected to correct contrast and brightness in said first, second and third camera corrected output signal vectors.

8. The method for correcting the image data of claim 1, further comprising:

(k) assessing said second corrected output signal vector by placing a reference color table in said observation area and recording first, second and third reference color output signals and comparing said second corrected output signal vector with the reference color table data.

9. The method for correcting the image data of claim 8, further comprising:

(l) selecting, in an iterative process, new values for said correction matrix's selected correction coefficients.

10. The method for correcting the image data of claim 9, further comprising:

(m) again assessing said second corrected output signal vector when recording said first, second and third reference color output signals and again comparing said second corrected output signal vector with the reference color table data, to determine whether said new values for said selected correction coefficients have more nearly approximated said reference color table data with the newest iteration of said second corrected output signal vector.

11. The method for correcting the image data of claim 10, further comprising:

(n) keeping said new values for said selected correction coefficients stored in a computer memory only if said new values for said selected correction coefficients have more nearly approximated said reference color table data with the newest iteration of said second corrected output signal vector.

12. The method for correcting the image data of claim 1, further comprising:

(k) defining a pixel-by-pixel correction matrix comprising selected pixel correction coefficients; said the selected pixel correction coefficients being selected to match intensity values.

13. The method for correcting the image data of claim 12, further comprising:

(l) multiplying said camera corrected output signal vector matrix with said pixel-by-pixel correction matrix to generate a third corrected output signal vector.

14. The method for correcting the image data of claim 12, further comprising:

(m) defining a display compensating exponent for a selected image or video display's non-linear characteristics.

15. The method for correcting the image data of claim 14, further comprising:

(n) generating a fourth corrected output signal vector by raising said third corrected output signal vector to the power of said display compensating exponent.

16. The method for correcting the image data of claim 14, further comprising:

(o) displaying a fourth corrected output signal vector on said selected image or video display.

17. The method for correcting the image data of claim 1, further comprising:

(k) selecting illumination source specific values for said correction matrix's selected correction coefficients to compensate for the characteristics of a selected illumination source illuminating said observation area, and assessing said second corrected output signal vector by placing the reference color table in said observation area and recording first, second and third reference color output signals and comparing said second corrected output signal vector with the reference color table data.

18. The method for correcting the image data of claim 17, further comprising:

(l) selecting, in an iterative process, new values for said correction matrix's selected correction coefficients.

19. The method for correcting the image data of claim 18, further comprising:

(m) again assessing said second corrected output signal vector when recording said first, second and third reference color output signals and again comparing said second corrected output signal vector with the reference color table data, to determine whether said new values for said selected correction coefficients have more nearly approximated said reference color table data with the newest iteration of said second corrected output signal vector; and (n) keeping said new values for said selected correction coefficients stored in a computer memory only if said new values for said selected correction coefficients have more nearly approximated said reference color table data with the newest iteration of said second corrected output signal vector.

20. The method for correcting the image data of claim 1, further comprising:

(k) selecting optical component specific values for said correction matrix's selected correction coefficients to compensate for the characteristics of a selected optical component used in recording said image, and assessing said second corrected output signal vector by placing a CIELAB reference color table in said observation area and recording first, second and third reference color output signals and comparing said second corrected output signal vector with CIELAB reference color table data;

(l) selecting, in an iterative process, new values for said correction matrix's selected correction coefficients;

(m) again assessing said second corrected output signal vector when recording said first, second and third reference color output signals and again comparing said second corrected output signal vector with CIELAB reference color table data, to determine whether said new values for said selected correction coefficients have more nearly approximated said CIELAB reference color table data with the newest iteration of said second corrected output signal vector; and (n) keeping said new values for said selected correction coefficients stored in a computer memory only if said new values for said selected correction coefficients have more nearly approximated said CIELAB reference color table data with the newest iteration of said second corrected output signal vector.

* * * * *

UNITED STATES PATENT AND TRADEMARK OFFICE
CERTIFICATE OF CORRECTION

PATENT NO.        : 7,477,294 B2
APPLICATION NO.   : 10/504845
DATED             : January 13, 2009
INVENTOR(S)       : Volker Lohweg et al.

Page 1 of 1

It is certified that error appears in the above-identified patent and that said Letters Patent is hereby corrected as shown below:

Col. 8, Claim 12, Line 3, after "comprising", insert --the--; and
Line 4, after "said", delete "the"

Signed and Sealed this

Seventh Day of April, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,477,294 B2 | Page 1 of 1 |
| APPLICATION NO. | : 10/504845 | |
| DATED | : January 13, 2009 | |
| INVENTOR(S) | : Volker Lohweg et al. | |

It is certified that error appears in the above-identified patent and that said Letters Patent is hereby corrected as shown below:

Col. 8, Claim 12, Line 20, after "comprising", insert --the--; and
               Line 21, after "said", delete "the"

This certificate supersedes the Certificate of Correction issued April 7, 2009.

Signed and Sealed this

Twenty-eighth Day of April, 2009

JOHN DOLL
*Acting Director of the United States Patent and Trademark Office*